US007938363B2

(12) United States Patent
Benkart et al.

(10) Patent No.: US 7,938,363 B2
(45) Date of Patent: May 10, 2011

(54) EMERGENCY OPENING DEVICE FOR AN OVERHEAD LOCKER WITH A LOWERABLE SHELL

(75) Inventors: Anton Benkart, Memmingen (DE); Tobias Gauggel, Riedlingen (DE); Oleg Graf, Illertissen (DE); Michael Klug, Ulm (DE); Georg Schuon, Blagnac (FR)

(73) Assignee: Airbus Deutschland GmbH, Hamburg (DE)

( * ) Notice: Subject to any disclaimer, the term of this patent is extended or adjusted under 35 U.S.C. 154(b) by 544 days.

(21) Appl. No.: 11/995,566

(22) PCT Filed: Jun. 27, 2006

(86) PCT No.: PCT/EP2006/006202
§ 371 (c)(1),
(2), (4) Date: Apr. 14, 2008

(87) PCT Pub. No.: WO2007/009556
PCT Pub. Date: Jan. 25, 2007

(65) Prior Publication Data
US 2008/0191093 A1   Aug. 14, 2008

(30) Foreign Application Priority Data

Jul. 15, 2005   (DE) .......................... 10 2005 033 259

(51) Int. Cl.
*B65D 6/28*   (2006.01)
*B65D 8/18*   (2006.01)
*B65D 45/16*  (2006.01)

(52) U.S. Cl. .................... 244/118.1; 220/4.23; 220/324; 220/326; 220/476; 220/478

(58) Field of Classification Search ................. 220/4.21, 220/4.22, 4.23, 324, 326, 476, 478; 224/118.1
See application file for complete search history.

(56) References Cited

U.S. PATENT DOCUMENTS

| 5,108,048 | A | 4/1992 | Chang |
| 5,823,472 | A * | 10/1998 | Luria .......................... 244/118.1 |
| 6,045,204 | A * | 4/2000 | Frazier et al. ................. 312/247 |
| 6,527,325 | B2 * | 3/2003 | Steingrebe et al. .......... 296/37.7 |
| 6,622,965 | B1 | 9/2003 | Sergiy |
| 7,143,977 | B2 * | 12/2006 | Graf et al. .................. 244/118.1 |
| 2001/0011692 | A1 | 8/2001 | Sprenger et al. |

FOREIGN PATENT DOCUMENTS

| DE | 4209037 | 9/1993 |
| DE | 10001038 | 9/2001 |
| EP | 0514957 | 11/1992 |

OTHER PUBLICATIONS

English translation of Decision on Granting A Patent for Invention, Russian Patent Office, Dec. 22, 2009.
International Search Reports, Form Nos. PCT/ISA/220, PCT/ISA/210, and PCT/ISA/237.

* cited by examiner

*Primary Examiner* — Anthony Stashick
*Assistant Examiner* — Madison L Wright
(74) *Attorney, Agent, or Firm* — Wood, Herron & Evans, LLP

(57) ABSTRACT

An emergency opening device for an overhead locker with a housing and a lowerable shell includes a connecting element which is connectable to a retention system operatively coupling the housing to the lowerable shell. The emergency opening device also includes a locking device adapted to move from a locked position in which the locking device is coupled with the connecting element to an unlocked position in which the locking device is uncoupled from the connecting element to release the lowerable shell from the retention system.

19 Claims, 4 Drawing Sheets

EMERGENCY OPENING DEVICE FOR AN OVERHEAD LOCKER WITH A LOWERABLE SHELL

This application claims the benefit of International Application No. PCT/EP2006/006202, filed on Jun. 27, 2006, under 35 U.S.C. §371 and/or as a continuation under 35 U.S.C. §120, and German Application No. 10 2005 033259.5, filed on Jul. 15, 2005.

TECHNICAL FIELD

The invention relates to an emergency opening device for an overhead locker with a lowerable shell and to an overhead locker fitted with an emergency opening device of this type.

BACKGROUND

Overhead lockers with a lowerable shell are currently used in passenger aeroplanes in particular as they advantageously allow optimum use of space and, at the same time, a high degree of operating convenience. The lowerable shell is pivotal from an upper closed position, in which optimum head freedom of the passenger sitting under the overhead lockers is ensured, into a lower, open loading or unloading position. Even relatively short people can comfortably deposit or remove items of luggage in/from the shell in the loading or unloading position.

Overhead lockers of this type conventionally comprise a retention system which is used to pivotally fasten the lowerable shell on a component secured to the structure, such as an overhead locker housing and/or a ceiling construction of an aircraft passenger cabin. The retention system may, moreover, be used to introduce tensile forces of a force-assisting device to raise the lowerable shell. A typical retention system comprises a cable, optionally guided over one or more guide roller(s), the ends of which are connected to the lowerable shell or the component secured to the structure.

A closure mechanism is also conventionally provided which can be provided in an easily accessible position and can be easily actuated. In its closed position the closure mechanism holds the lowerable shell in its upper closed position, while in its open position it allows lowering of the overhead locker shell from its upper closed position into its lower, open loading or unloading position. Consequently convenient operation of the overhead locker is made possible. At the same time risks of injury are avoided which, for example, could result owing to uncontrolled lowering of the shell.

In principle, for safety reasons, there is a need in particular when using an overhead locker with a lowerable shell in passenger aeroplanes that the lowerable shell can be brought from its upper closed position into its lower, open loading or unloading position even in the event of the retention system malfunctioning, which can be triggered for example by jamming of the cable or a fire in the overhead locker. Therefore overhead lockers of this type also comprise an emergency opening device which, if required, separates the retention system from the lowerable shell or component secured to the structure. For example the emergency opening device may be configured in such a way that it separates the guided cable of the retention system from the lowerable shell in the event of an actuation.

A known emergency opening device comprises a shearing pin which tears when a corresponding trigger force is applied, for example by forceful pulling on the lowerable shell, so that the guided cable of the retention system is separated from the lowerable shell. Use of an emergency opening device with a shearing pin has the drawback that, depending on the overall construction of the overhead locker and the lever conditions resulting therefrom on the guided cable of the retention system, very high forces are possibly required to trigger the emergency opening device. Owing to manufacturing and assembly tolerances high dispersion of the triggering force may also occur. It is also disadvantageous, in particular in the event of a fire in the overhead locker, that the emergency opening device has to be actuated by pulling on the lowerable shell as smoke or flames may possibly issue from the overhead locker and injure the person actuating the emergency opening device. Finally, during normal operation of the overhead locker there is the risk of unintentional triggering of the emergency opening device.

DE 100 01 038 A1 discloses an overhead locker with a lowerable shell which comprises a motive drive device for lowering the overhead locker shell from an upper closed position into a lower, open position and for raising the overhead locker shell from the lower, open position into the upper closed position. The drive device is, for example, constructed as a toothed belt drive and comprises a drive motor, the rotary movement of which can be transmitted via a splined shaft to a toothed belt. A catch of the toothed belt drive is fastened to support arms of the lowerable shell via brackets provided with rollers, so that the lowerable shell can be moved between its upper closed position and its lower, open position by an actuation of the toothed belt drive. To fix the overhead locker shell in its upper closed position there is a locking device driven by a lifting magnet which can be actuated by means of an actuating switch. To allow manual opening and closing of the overhead locker even in the event of failure of the motive drive device, a coupling arranged on the splined shaft of the toothed belt is provided. The coupling can be moved via a hand lever and a cable pull into a disengaged position in order to decouple the non-functioning drive motor from the force-transmitting components of the belt drive. Actuation of the actuating switch can subsequently unlock the lifting magnet-operated locking device and the overhead locker shell can be manually moved into its lower, open position.

The object of the invention is to provide an emergency opening device for an overhead locker with a lowerable shell, which device, if required, allows reliable separation of a retention system for fastening the lowerable shell to a component secured to the structure from the lowerable shell or the component secured to the structure and which can also be actuated simply and safely. The invention is also directed to the object of providing an overhead locker fitted with an emergency opening device of this type.

SUMMARY OF THE INVENTION

This object is achieved by an emergency opening device for an overhead locker with a lowerable shell and an overhead locker as described below.

The emergency opening device according to the invention for an overhead locker with a lowerable shell comprises a connecting element which is connectable to a retention system for fastening the lowerable shell to a component secured to the structure. The component secured to the structure may for example be an overhead locker housing or a ceiling construction, in particular a ceiling construction of an aeroplane passenger cabin. A locking device of the emergency opening device is connectable either to the lowerable shell or the component secured to the structure. This locking device is adapted to fasten the connecting element to the lowerable shell or the component secured to the structure, in a locked position, and to allow separation of the connecting element from the lowerable shell or the component secured to the structure, in an unlocked position. In other words, in the assembled state of the locking device the connecting element, and thus the retention system, may be separated from the lowerable shell or the component secured to the structure by a movement of the locking device from its locked position into its unlocked position. As a result the lowerable shell may be brought from its upper closed position into its lower, open loading or unloading position even if the retention system malfunctions.

The emergency opening device according to the invention has the advantage that to actuate the locking device, i.e. for movement of the locking device from its locked position into its unlocked position, no particular force application is required. In contrast to an emergency opening device comprising a shearing pin, the emergency opening device according to the invention can thus be actuated even by people who are not very strong. In particular when using the emergency opening device according to the invention in an overhead locker with a lowerable shell on board a passenger aeroplane this contributes to increased safety.

The locking device of the emergency opening device according to the invention is preferably configured in such a way that it may be repeatedly moved from its locked position into its unlocked position and back again. Furthermore, owing to the fact that only relatively low forces occur on actuation of the emergency opening device, damage to components thereof, for example the connecting element or the locking device, is virtually ruled out. After triggering the emergency opening device can therefore generally be made ready for operation again relatively easily.

In a preferred embodiment of the emergency opening device according to the invention the locking device comprises a base panel which is connectable to the lowerable shell of the overhead locker or the component secured to the structure. The base panel can for example comprise one or more aperture(s) and be fastened by means of a screwed or riveted joint to the lowerable shell or the component fastened to the structure. Alternatively, the base panel may also be glued to the lowerable shell or the component secured to the structure.

The locking device also preferably comprises a lever which is pivotal about an axis and movable between a first and a second position. The lever may be adapted to cooperate with the connecting element in its first position and to release the connecting element in its second position. In other words, by moving the pivotal lever from its first position into its second position a connection between the connecting element and the locking device may be released. In the assembled state of the emergency opening device according to the invention the retention system for fastening the lowerable overhead locker shell to a component secured to the structure may thus be separated from the lowerable shell or the component secured to the structure by a movement of the pivotal lever from its first position into its second position. A lever mechanism of this type may be easily actuated even by unpractised people and thus contributes to increasing the safety of the emergency opening device.

The pivotal lever of the locking device can for example be fastened by means of a screwed or riveted joint directly to the lowerable shell or the component secured to the structure. Alternatively, the lever may also be connected to the base panel of the locking device. In this case the base panel and the lever can be pre-assembled on the lowerable shell or the component secured to the structure as an independent module before assembly of the locking device.

The lever is preferably pivotal about an axis which is arranged at a first end or in the vicinity of the first end of the lever. For fixing the position of the swivelling axis, an opening may be formed in the lever through which a bearing pin or the like is passed. By using the entire, or virtually the entire, length of the lever as a lever arm the lever may then moved between its first and second positions by applying a relatively low force to a second end of it. As a result the force expenditure required to actuate the emergency opening device according to the invention may be reduced further.

The lever of the locking device is preferably resiliently pretensioned in its first position in which it provides a connection of the locking device to the connecting element and, in the assembled state of the emergency opening device, fastens the retention system to the lowerable shell or the component secured to the structure. The lever audibly engages with the connecting element during assembly of the emergency opening device owing to the resilient pretensioning of the pivotal lever. This consequently already allows certain checking of the proper connection between the locking device and the connecting element. Furthermore, the resilient force applied by the spring must firstly be overcome when the emergency opening device is actuated, in order to move the lever from its first position into its second position and thus separate the connecting element from the locking device and consequently separate the retention system from the lowerable shell or the component secured to the structure. As a result the risk of unintentional actuation of the emergency opening device is minimised.

In a preferred embodiment of the emergency opening device according to the invention, a locking nose is formed on the lever of the locking device. This locking nose is adapted to cooperate with a locking projection provided on the connecting element in the first position of the lever and to release the locking projection of the connecting element in the second position. Such a configuration of the lever and connecting element is relatively simple in terms of construction, can be inexpensively implemented and also allows secure connection between the connecting element and the locking device if the lever is in its first position.

The emergency opening device according to the invention preferably comprises a sliding block for sliding guidance of a preferably flat article, which, as has yet to be described in detail, can be used to move the pivotal lever of the locking device between its first and second positions. This ensures proper actuation of the lever if the person triggering the emergency opening device cannot see it. The sliding block may be fastened to the lowerable shell or the component secured to the structure by means of a screwed, riveted or glued joint.

In a preferred embodiment of the emergency opening device according to the invention, the locking device comprises a guide device for receiving and guiding the connecting element. The guide device can be constructed as a separate component and be fastened by means of a screwed, riveted or glued joint for example to the lowerable shell or the component secured to the structure. Alternatively, the guide device may also be attached to the base panel of the locking device or formed integrally therewith.

The guide device preferably comprises first and second guide elements, the first and second guide elements being arranged at a spacing from each other and between them forming a receiver for the connecting element. This arrangement has the advantage that when connecting the connecting element to the locking device and when separating the connecting element from the locking device, in the event of triggering of the emergency opening device the connecting element is displaced relative to the locking device in a guided and thus controlled manner.

A guide rail, which is adapted to cooperate with a guide groove provided on the guide device, is preferably formed on the connecting element. The guide rail can, for example, be provided on a side face of the connecting element and cooperate with a guide groove formed on the first or second guide element. It is understood that the connecting element may also be provided with a guide rail on two side faces, wherein in this case the first and second guide elements of the guide device comprise corresponding guide grooves. The configuration of the connecting element with a guide rail and the provision of a guide device provided with a guide groove allows particularly secure guidance of the connecting element in the guide device in a relatively simple manner in terms of construction.

A stop is preferably provided on the connecting element. This stop is used when connecting the connecting element to the locking device to fix the position of the connecting element relative to the locking device. The stop can, for example, be arranged adjacent to the guide rail formed on the connecting element and cooperate with a side face of the guide device if the connecting element is connected to the locking device.

In a preferred embodiment of the emergency opening device according to the invention the connecting element comprises a cable connection device. A cable connection device of this type is used for fastening the connecting element to a cable of the retention system via which the lowerable shell of the overhead locker is fastened to a component secured to the structure. The cable connection device is preferably provided with an adjusting device comprising a setscrew for finely adjusting the length of the retention system cable.

An overhead locker according to the invention comprises a lowerable shell, a retention system for fastening the lowerable shell to a component secured to the structure, for example an overhead locker housing and/or a ceiling construction of an aeroplane passenger cabin, and an above-described emergency opening device. By means of the emergency opening device the lowerable shell of the overhead locker may be moved in a simple, quick, controlled and safe manner from its upper closed position into its lower, open loading or unloading position even in the event of the retention system malfunctioning, which can be triggered for example by jamming of a retention system cable or by a fire in the overhead locker.

In a preferred embodiment of the overhead locker according to the invention, the emergency opening device is arranged on an outer face of the side wall of the lowerable shell or on the component secured to the structure. For example the locking device of the emergency opening device may be fastened in a region adjoining a base of the lowerable shell at the side wall thereof. In the assembled state of the emergency opening device the retention system for fastening the lowerable overhead locker shell to a component secured to the structure is separated from the lowerable shell when the emergency opening device is actuated. Consequently, with simultaneous actuation of a closure mechanism, which holds the lowerable shell in its upper closed position during normal operation of the overhead locker, the lowerable shell is moved from its upper closed position into its lower, open loading or unloading position. To prevent the shell from dropping down in an uncontrolled manner, what are referred to as end stops are conventionally provided on the overhead locker and/or a component secured to the structure, for example the overhead locker housing or the ceiling construction of the aeroplane passenger cabin, which stops hold the lowerable shell in a predetermined end position after an actuation of the emergency opening device and the separation associated therewith of the lowerable shell from the retention system.

The emergency opening device has a relatively low depth. It is therefore not necessary to form a receiver for the emergency opening device which, for example, could be produced by milling out the side wall of the lowerable shell. Rather the emergency opening device can be received in an conventionally approximately 15 mm wide gap which exists between the side wall of the lowerable shell and a side wall of an overhead locker housing in the closed state of the overhead locker.

The sliding block of the emergency opening device can be attached to a narrow projection for example which extends substantially perpendicularly to the outer face of the side wall of the lowerable shell in a region of the side wall of the lowerable shell adjoining the base of the lowerable shell. The overhead locker according to the invention can thus be fitted with the emergency opening device with relatively low manufacturing and assembly expenditure.

Between adjacent overhead lockers in the passenger cabin of an aeroplane there is conventionally a spacing which is sufficient that the emergency opening device provided on the outer face of the side wall of the lowerable overhead locker shell, i.e. the lever of the locking device, can be actuated by introducing a flat object, such as a credit card or a spoon, into a gap between adjacent overhead lockers, i.e. from a lateral position. Simple and controlled actuation of the emergency operating device is thus possible. To the contrary, vigorous pulling on the lowerable shell, as is required for example with an emergency opening device fitted with a shearing pin, is not necessary. As a result, risks of injury to the person actuating the emergency opening device are minimised in particular in the event of a fire in the overhead locker.

The overhead locker according to the invention preferably comprises two retention systems for fastening the lowerable shell to a component secured to the structure, a first retention system being provided in the region of a first side wall and a second retention system being provided in the region of a second side wall of the lowerable shell opposing the first side wall. The overhead locker then also comprises two emergency opening devices, a first emergency opening device being arranged on the first side wall of the lowerable shell and a second emergency opening device being arranged on the second side wall of the lowerable shell. In an overhead locker of this type, if required, controlled actuation of only one emergency opening device is also possible, so that the lowerable shell of the overhead locker can be separated from only one retention system and can remain connected to the other retention system.

The overhead locker according to the invention preferably comprises a cover element which partially surrounds the emergency opening device. The cover element can, for example, be detachably fastened to a side wall of the lowerable shell of the overhead locker and configured in such a way that the actuation of the locking device lever is not affected. The cover element protects the emergency opening device, in particular if the lowerable shell is in its lower, open loading or unloading position during normal operation of the overhead locker, against soiling and reduces the risk of unintentional actuation of the emergency opening device.

If the overhead locker according to the invention comprises a cover element the sliding block of the emergency opening device may be formed integrally therewith or fastened thereto.

A window is preferably formed in the cover element. A simple check can be made through this window during operation of the overhead locker as to whether the connecting element is properly connected to the locking device, without it being necessary to disassemble the cover element. It is understood, however, that the cover element can also be constructed without a window.

BRIEF DESCRIPTION OF THE DRAWINGS

Preferred embodiments of the emergency opening device according to the invention and of the overhead locker according to the invention will now be described in more detail with reference to the accompanying drawings, in which.

DETAILED DESCRIPTION

Figure 1:
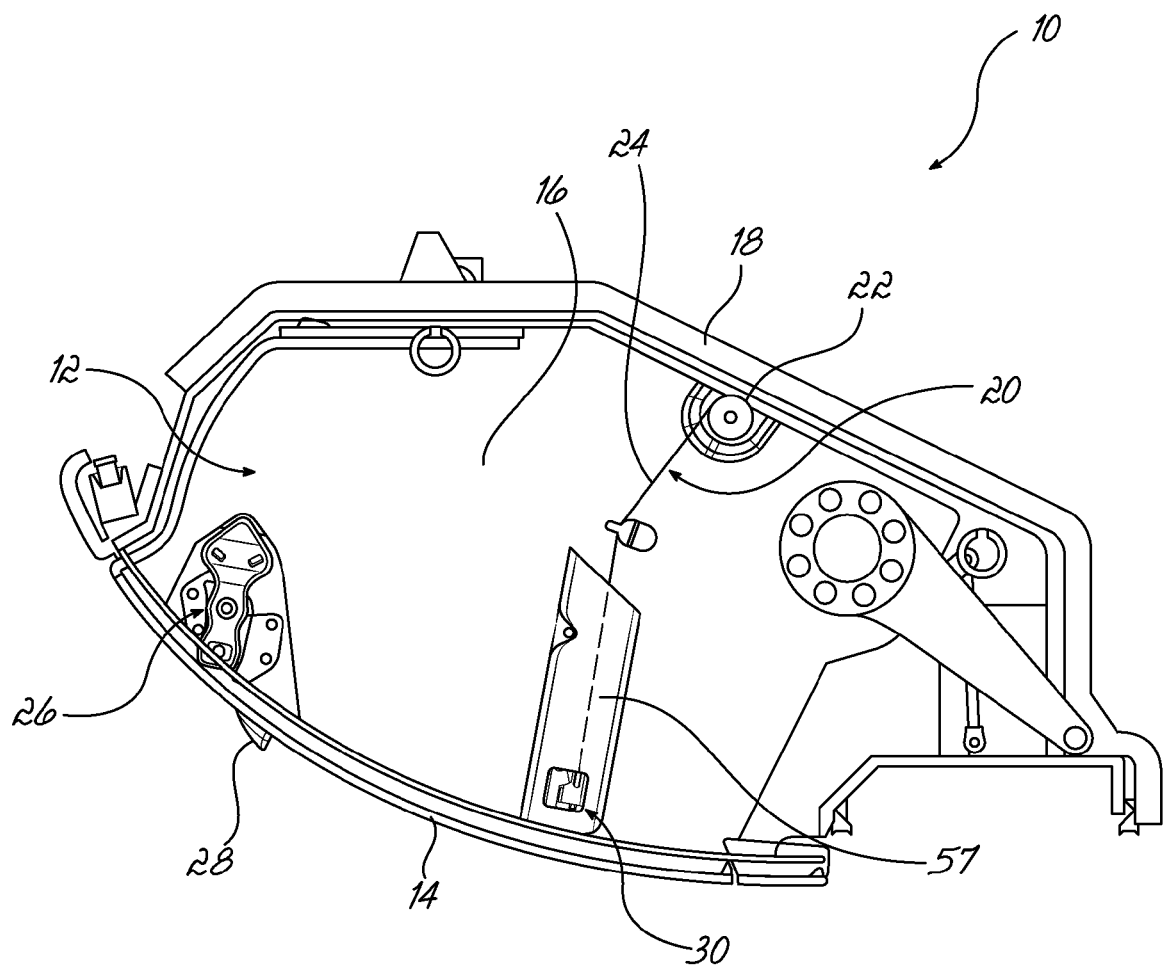
FIG. 1 shows an overhead locker according to the invention with a lowerable shell and an emergency opening device, the lowerable shell being in its upper closed position.
Figure 2:
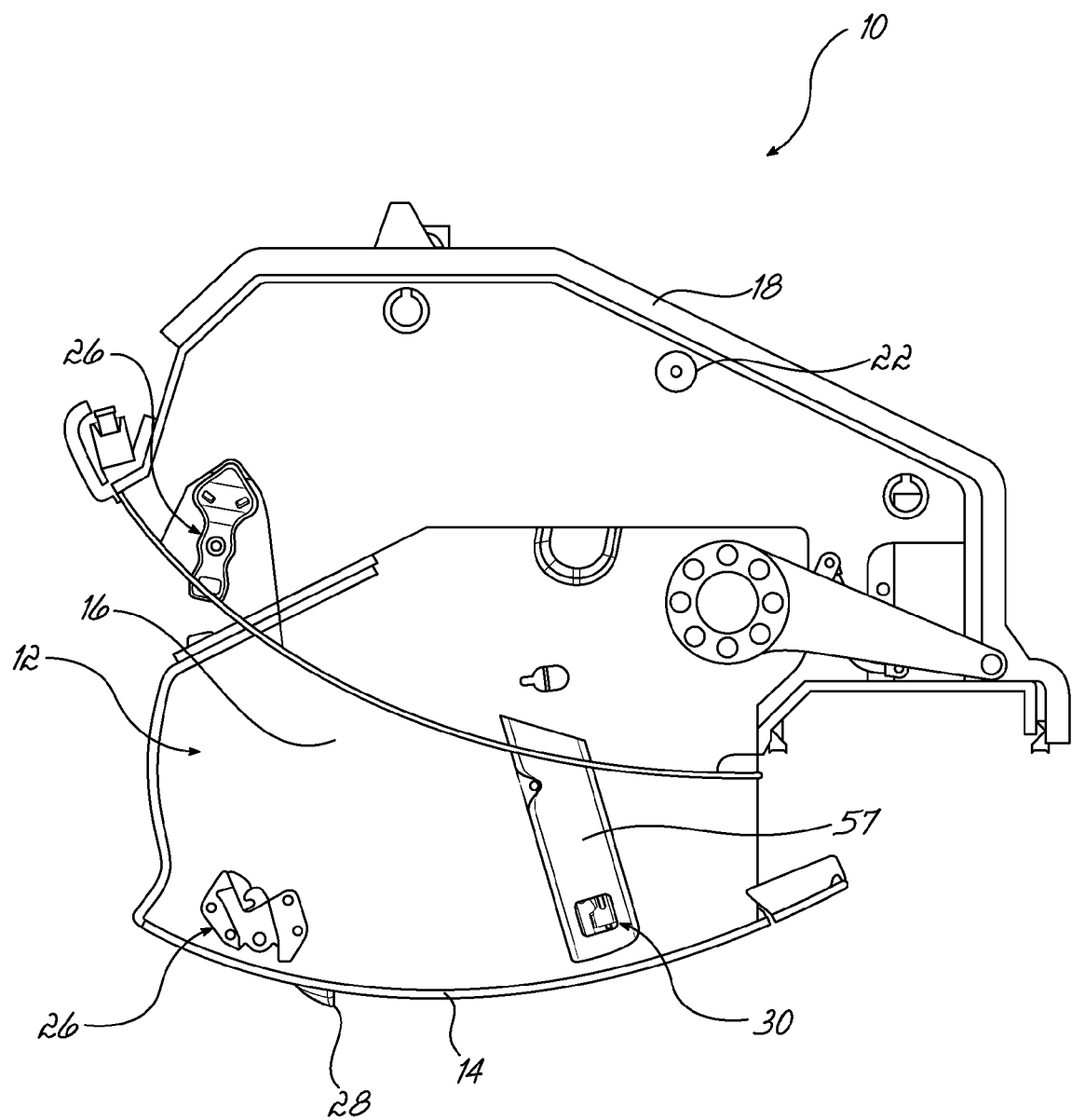
FIG. 2 shows the overhead locker according to the invention illustrated in FIG. 1, the lowerable shell being in its lower, open loading or unloading position.

An overhead locker 10 shown in FIGS. 1 and 2 comprises a lowerable shell 12 which comprises a base 14 and two mutually opposing side walls 16. The lowerable shell 12 can be pivoted from an upper closed position shown in FIG. 1, in which it is received in an overhead locker housing 18, into a lower, open loading or unloading position shown in FIG. 2. The overhead locker housing 18 is rigidly fastened to a ceiling construction, not shown in the figures, of an aeroplane passenger cabin.

The lowerable shell 12 of the overhead locker 10 is connected to the overhead locker housing 18 by means of two retention systems 20 which are each arranged in the region of the side walls 16 of the lowerable shell 12. Each retention system 20 comprises a guide roller 22 fastened to the overhead locker housing 18. A cable 24 shown in FIG. 1 is guided over the guide roller 22 and provides a connection of the lowerable shell 12 to the overhead locker housing 18. For reasons of clarity, the cable 24 guided over the guide roller 22 is not shown in FIG. 2.

The overhead locker 10 also comprises a closure mechanism 26 which in its closed position shown in FIG. 1 holds the lowerable shell 12 of the overhead locker 10 in its upper closed position. In its open position shown in FIG. 2, the closure mechanism 26 by contrast allows lowering of the shell 12 into its lower, open loading or unloading position. The closure mechanism 26 comprises an actuating lever 28 which is attached to an outer side of the base 14 of the lowerable shell 12 and is thus easily accessible for example from a central aisle of the aeroplane passenger cabin during operation of the overhead locker 10.

Figure 3:
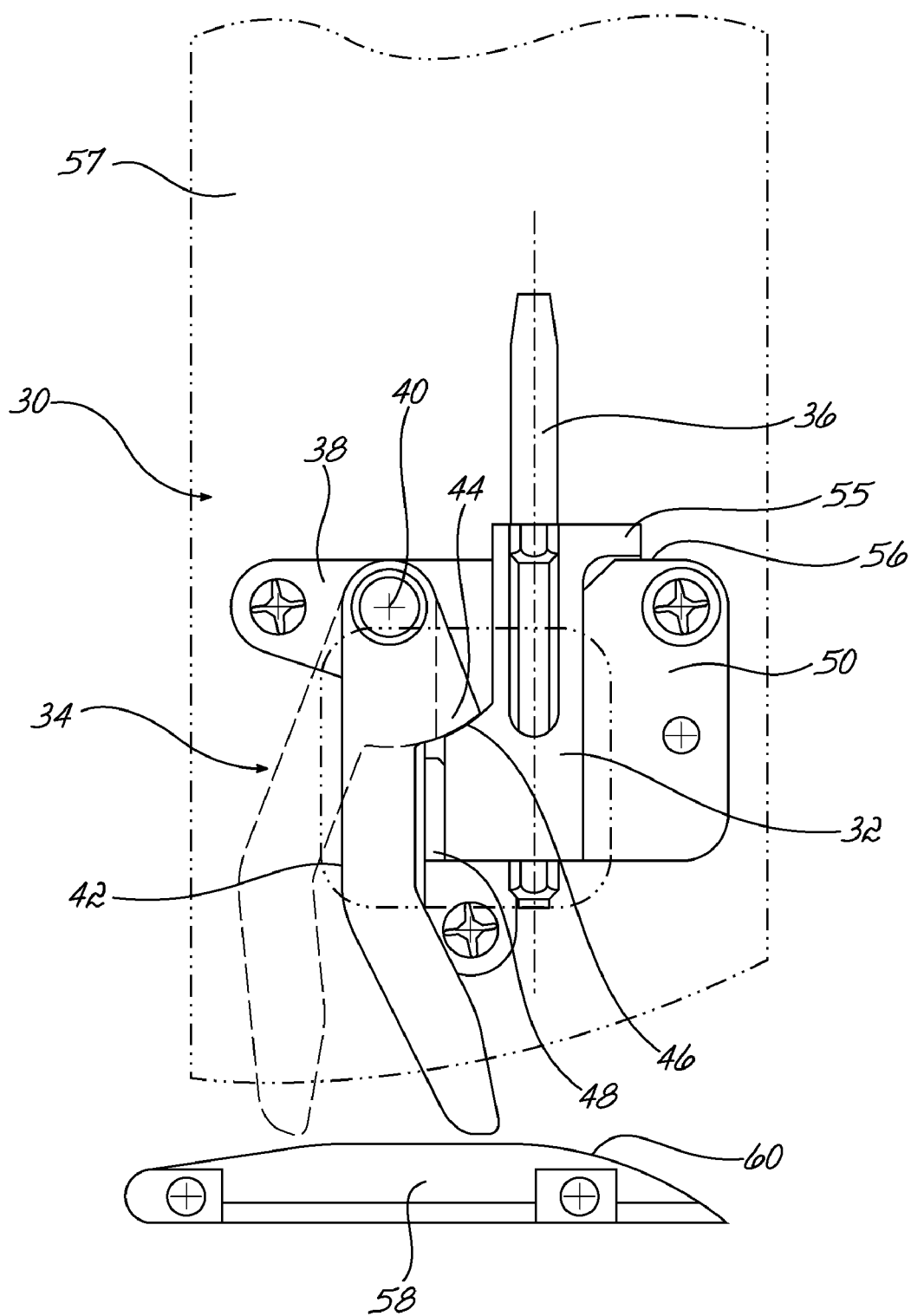
FIG. 3 shows an emergency opening device according to the invention for an overhead locker with a lowerable shell.
Figure 5:
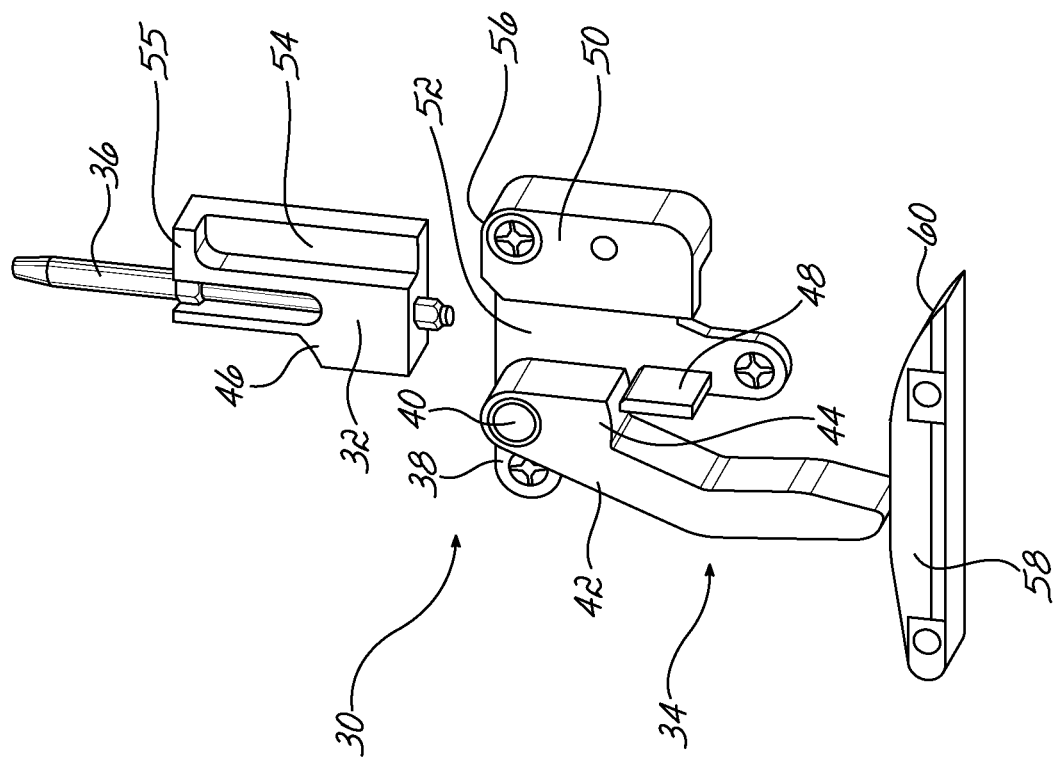
FIG. 5 shows a three dimensional illustration of the emergency opening device shown in FIG. 1 in its unlocked position.
Figure 4:
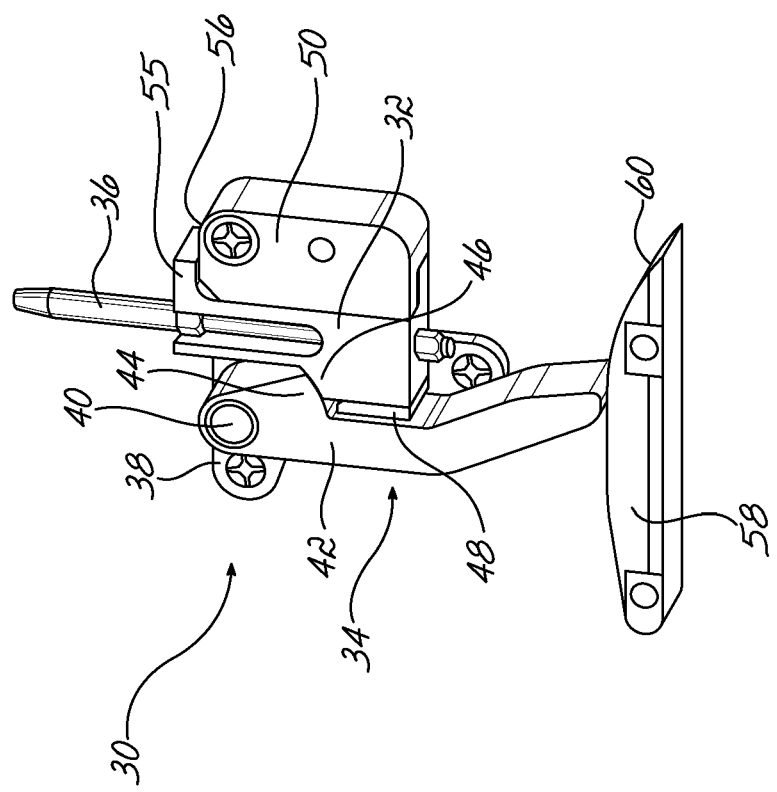
FIG. 4 shows a three-dimensional illustration of the emergency opening device shown in FIG. 1 in its locked position.

A respective emergency opening device 30, illustrated in detail in FIG. 3 to 5, is provided on the outer faces of both mutually opposing side walls 16 of the lowerable shell 12. The emergency opening devices 30 are used to allow pivoting of the lowerable shell 12 from its upper closed position shown in FIG. 1 into its lower, open loading or unloading position shown in FIG. 2 even in the event of the retention system 20 malfunctioning, which could be triggered for example by jamming of the guided cables 24 or a fire in the overhead locker 10.

The emergency opening devices 30 each have a relatively low depth. The emergency opening devices 30 may therefore be received in an approximately 15 mm wide gap which is present in the closed state of the overhead locker 10 shown in FIG. 1 between the side walls 16 of the lowerable shell 12 and side walls of the overhead locker housing 18 opposing these side walls 16.

As can best be seen in FIG. 3 to 5, the emergency opening device 30 comprises a connecting element 32 and a locking device 34. The connecting element 32 comprises a cable connection device 36 which is used to fasten the connecting element 32 to the guided cable 24 of the retention system 20. The cable connection device 36 is provided with an adjusting device which allows fine adjustment of the length of the retention system cable 24 during assembly of the retention system 20 and the emergency opening device 30.

The locking device 34 comprises a base panel 38 which in the assembled state of the emergency opening device 30 is screwed to the side wall 16 of the lowerable shell 12. A lever 42 pivotal about a journal 40 between a first position (see FIG. 3, solid line and FIG. 4) and a second position (see FIG. 3, broken line and FIG. 5) is attached to on the base panel 38. Formed on the lever 42 is a locking nose 44 which, in the first position of the lever 42, if the locking device 34 of the emergency opening device 30 is connected to the connecting element 32, cooperates with a locking projection 46 provided on the connecting element 32. In the second position of the lever 42, on the other hand, the locking nose 44 formed on the lever 42 releases the locking projection 46 of the connecting element 32. The lever 32 is pretensioned in its first position by a spring not shown in the figures.

The locking device 34 of the emergency opening device 30 also comprises a guide device with first and second guide elements 48, 50. The first and second guide elements 48, 50 are formed integrally with the base panel 38 and arranged at a spacing from each other in order to form between them a receiver 52 for the connecting element 32 (see FIG. 5). Formed on the connecting element 32 is a guide rail 54 which is received in a guide groove provided on the second guide element 50 if the connecting element 32 is connected to the locking device 34. A stop 55 arranged adjacent to the guide rail 54 is also formed on the connecting element 32. The stop 55 cooperates with a side face 56 of the second guide element 50 if the connecting element 32 is connected to the locking device 34.

As can be seen in FIG. 1 to 3, each emergency opening device 30 provided on the side walls 16 of the lowerable shell 12 is partially surrounded by a cover element 57 fastened to the respective side wall 16. As may best be seen in FIG. 3, the cover element 57 is configured in such a way that actuation of the lever 42 of the locking device 34 is not affected. A window is formed in the cover element 57 which allows the operating state of the emergency operating device 30 to be checked, without disassembly of the cover element 57 being necessary.

Finally, the emergency opening device 30 comprises a sliding block 58 for sliding guidance of a flat article which, as has yet to be described, can be used to move the pivotal lever 42 of the locking device 34 between its first and its second position. The sliding block 58 is attached to a projection (not shown in the figures) which extends substantially perpendicularly to the outer face of the side wall 16 of the lowerable shell 12 and is positioned such that, on a displacement between its first and second positions, the lever 42 slides over a surface 60 of the sliding block 58. Alternatively, the sliding block 58 of the emergency opening device 30 may also be formed integrally with the cover element 57 or be fastened thereto.

The function of the overhead locker 10 and of the emergency opening device 30 will be described in more detail hereinafter. During normal operation of the overhead locker 10 each emergency opening device 30 makes a connection between the lowerable shell 12 of the overhead locker 10 and the guided cable 24 of the associated retention system 20 and thus the overhead locker housing 18.

During assembly of the emergency opening device 30 the base panel 38 of the locking device 34, with the lever 42 and the first and second guide elements 48, 50, is firstly screwed to the outer face of the side wall 16 of the lowerable shell 12. Furthermore, the sliding block 58 is attached to the projection extending substantially perpendicularly to the outer face of the side wall 16 of the lowerable shell 12. The last-mentioned assembly step may be omitted if the sliding block 58 is, as mentioned above, formed integrally with the cover element 57 or is fastened thereto.

Thereafter, the connecting element 32 connected to the guided cable 24 of the retention system 20 via the cable connection device 36 is introduced into the locking device 34 such that the guide rail 54 formed on the connecting element 32 is received in the guide groove formed on the second guide element 50. The connecting element 32 is displaced relative to the locking device 34 in the direction of the sliding block 58 until the stop 55 formed on the connecting element 32 abuts the side face 56 of the second guide element 50 and the locking nose 44 formed on the lever 42 of the locking device 34 audibly engages with the locking projection 46 provided on the connecting element 32. Finally, if required, the length of the guided cable 24 of the retention system 20 may also be finely adjusted by means of the adjusting device.

During normal operation of the overhead locker 10, the closure mechanism 26 is opened by actuation of the actuating lever 28 to open the overhead locker 10, so the lowerable shell 12 can be pivoted from its upper closed position into its lower, open loading or unloading position. In the process the emergency opening device 30 remains in its locked position in which the connecting element 32 is connected to the locking device 34.

If it is not possible to open the overhead locker 10 owing to malfunctioning of one retention system 20, or both retention systems 20, which can be triggered for example by jamming of a guided cable 24, or both guided cables 24, or a fire in the overhead locker 10, by simply actuating the locking mechanism 26, the lowerable shell 12 of the overhead locker 10 can be moved by simultaneously actuating the closure mechanism 26 and the emergency opening device 30 from its upper closed position into its lower, open loading or unloading position. To actuate the emergency opening device 30 a flat article, such as a credit card or a spoon, is introduced into a gap between adjacent overhead lockers 10 in an aeroplane passenger cabin and the lever 42 of the locking device 34 is displaced from its first position into its second position. The movement of the flat article is in the process guided by the sliding block 58, so proper actuation of the lever 42 is ensured although the person triggering the emergency opening device 30 cannot see the device 30.

By displacing the lever 42 from its first position into its second position the locking nose 44 formed on the lever 42 disengages from the locking projection 46 provided on the connecting element 32, so the connection between the connecting element 32 and the locking device 34 is broken. Consequently the connection between the lowerable shell 12 and the overhead locker housing 18 is also broken, so the lowerable shell 12 of the overhead locker 10 is moved from its upper closed position into its lower, open loading or unloading position as a result of gravity. Movement of the lowerable shell 12 is limited by what are referred to as end stops, so uncontrolled dropping of the shell 12 is avoided.

As the overhead locker 10 is provided with two retention systems 20 and emergency opening devices 30 each arranged in the region of the mutually opposing side walls 16 of the lowerable shell 12, if required just one emergency opening device 30 can be actuated, so the lowerable shell 12 of the overhead locker 10 is separated from only one retention system 20, while it remains connected to the other retention system 20.

The locking device 34 of the emergency opening device 30 is configured in such a way that it can be repeatedly moved between its locked position and its unlocked position by moving the lever 42 between its first and second positions. After triggering the emergency opening device 30 the device 30 may therefore easily be made ready for operation again by firstly detaching the cover element 57 from the side wall 16 of the lowerable shell 12 and subsequently connecting the connecting element 32 to the locking device 34 of the emergency opening device 30 again. Once the cover element 57 is repositioned the emergency opening device 30 is ready for operation again.

The invention claimed is:

1. An emergency opening device for an overhead locker including a housing, a lowerable shell operatively coupled to the housing by a retention system configured to control movement of the lowerable shell, and a primary closure mechanism configured to hold the lowerable shell in a closed position, the emergency opening device comprising:
   a connecting element coupled with the retention system and thereby operatively coupled to the housing, and
   a locking device coupled with the lowerable shell and adapted to move from a locked position wherein the locking device is coupled with the connecting element to thereby couple the lowerable shell to the housing via the retention system, to an unlocked position wherein the locking device is uncoupled from the connecting element to release the lowerable shell from the retention system such that the lowerable shell is movable to an open position without interference from the retention system if the primary closure mechanism is not engaged.

2. The emergency opening device according to claim 1, wherein the locking device comprises a base panel coupled to the lowerable shell and a lever configured to pivot about an axis between a first position cooperating with the connecting element and a second position configured to release the connecting element from the locking device.

3. The emergency opening device according to claim 2, wherein the lever of the locking device is resiliently pretensioned in the first position.

4. The emergency opening device according to claim 2, wherein the lever includes a locking nose adapted to cooperate with a locking projection on the connecting element in the first position of the lever.

5. The emergency opening device according to claim 2, further comprising a sliding block coupled to the overhead locker and configured to provide access and sliding guidance of an article into the overhead locker while the lowerable shell is in the closed position such that the article can be used to move the lever between the first and second positions.

6. The emergency opening device according to claim 1, wherein the locking device comprises a guide device for receiving and guiding the connecting element.

7. The emergency opening device according to claim 6, wherein the connect element includes a guide rail adapted to cooperate with a guide groove provided on the guide device.

8. The emergency opening device according to claim 1, wherein the connecting element includes a stop for fixing the position of the connecting element relative to the locking device.

9. The emergency opening device according to claim 1, wherein the connecting element comprises a cable connection device for fastening the connecting element to a cable of the retention system.

10. An emergency opening device for an overhead locker including a housing, a lowerable shell operatively coupled to the housing by a retention system configured to control movement of the lowerable shell, and a primary closure mechanism configured to hold the lowerable shell in a closed position, the emergency opening device comprising:
- a connecting element coupled with the retention system and thereby operatively coupled to the lowerable shell, and
- a locking device coupled with the housing and adapted to move from a locked position wherein the locking device is coupled with the connecting element to thereby couple the housing to the lowerable shell via the retention system, to an unlocked position wherein the locking device is uncoupled from the connecting element to release the lowerable shell and the retention system from the housing such that the lowerable shell is movable to an open position without interference from the retention system if the primary closure mechanism is not engaged.

11. The emergency opening device according to claim 10, wherein the locking device comprises a base panel coupled to the housing and a lever configured to pivot about an axis between a first position cooperating with the connecting element and a second position configured to release the connecting element from the locking device.

12. The emergency opening device according to claim 11, wherein the lever of the locking device is resiliently pretensioned in the first position.

13. The emergency opening device according to claim 11, wherein the lever includes a locking nose adapted to cooperate with a locking projection on the connecting element in the first position of the lever.

14. The emergency opening device according to claim 11, further comprising a sliding block coupled to the overhead locker and configured to provide access and sliding guidance of an article into the overhead locker while the lowerable shell is in the closed position such that the article can be used to move the lever between the first and second positions.

15. The emergency opening device according to claim 10, wherein the connecting element comprises a cable connection device for fastening the connecting element to a cable of the retention system.

16. An overhead locker comprising:
- a housing;
- a lowerable shell pivotally coupled to the housing and configured to move from a closed position within the housing and an open position;
- a retention system operatively coupling the housing and the lowerable shell to thereby control movement of the lowerable shell between the closed position and the open position;
- a primary closure mechanism configured to hold the lowerable shell in the closed position; and
- an emergency opening device including a connecting element coupled with the retention system and a locking device coupled with the lowerable shell, wherein the locking device is configured to move from a locked position wherein the locking device is coupled with the connecting element to thereby couple the lowerable shell to the housing via the retention system, to an unlocked position wherein the locking device is uncoupled from the connecting element to release the lowerable shell from the retention system such that the lowerable shell is movable to the open position without interference from the retention system if the primary closure mechanism is not engaged.

17. The overhead locker of claim 16, further comprising:
a cover at least partially surrounding the emergency opening device.

18. The overhead locker of claim 17, further comprising:
a window formed in the cover and configured to provide visual access to the emergency opening device surrounded by the cover.

19. The overhead locker of claim 16, further comprising:
a sliding block configured to provide access and sliding guidance of an article into the overhead locker while the lowerable shell is in the closed position such that the article can be used to move the locking device between the locked position and the unlocked position.

* * * * *